United States Patent
Xu

(10) Patent No.: US 10,413,470 B2
(45) Date of Patent: Sep. 17, 2019

(54) LOWER LIMB REHABILITATION TRAINING ROBOT

(71) Applicant: JIMHO ROBOT (SHANGHAI) CO., LTD., Shanghai (CN)

(72) Inventor: Zhenhua Xu, Shanghai (CN)

(73) Assignee: JIMHO ROBOT (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/569,081

(22) PCT Filed: Jun. 9, 2015

(86) PCT No.: PCT/CN2015/081042
§ 371 (c)(1),
(2) Date: Oct. 24, 2017

(87) PCT Pub. No.: WO2016/173091
PCT Pub. Date: Nov. 3, 2016

(65) Prior Publication Data
US 2018/0133087 A1    May 17, 2018

(30) Foreign Application Priority Data

Apr. 27, 2015 (CN) .................... 2015 2 0263283 U

(51) Int. Cl.
*A61H 3/00* (2006.01)
*A61H 1/00* (2006.01)
(Continued)

(52) U.S. Cl.
CPC .......... *A61H 1/0255* (2013.01); *A61H 1/024* (2013.01); *A61H 1/0244* (2013.01);
(Continued)

(58) Field of Classification Search
CPC ............ A61G 7/10; A61G 7/012; A61G 5/14; A61H 2201/0192; A61H 2201/5035;
(Continued)

(56) References Cited

U.S. PATENT DOCUMENTS 2,695,017 A * 11/1954 Herrmeyer ........... A61G 13/009
606/245
4,057,240 A * 11/1977 Damico ............. A61G 13/0018
5/611
(Continued)

FOREIGN PATENT DOCUMENTS

CN    101518490 A    9/2009
CN    101972196 A *  2/2011    ............... A61H 1/02
(Continued)

OTHER PUBLICATIONS

English Translation for CN101972196, Espacenet.com, translated on May 8, 2018.*
(Continued)

*Primary Examiner* — Michael J Tsai
*Assistant Examiner* — Tu A Vo
(74) *Attorney, Agent, or Firm* — Apex Attorneys at Law, LLP; Yue (Robert) Xu

(57) ABSTRACT

A lower limb rehabilitation training robot includes a base bedstead. A vertical lifting module, a horizontal movement module and a steel cable are arranged on the base bedstead. The vertical lifting module is hinged to one end of a bedstead main body of the rising bedstead, and an adjustment device allowing the bedstead main body to rotate is provided between the vertical lifting module and the bedstead main body. A slider movable horizontally and a hanging rope having one end connected to the slider are arranged on a hanger frame connected to the rising bedstead, a guide wheel configured to tension the hanging rope is
(Continued)

fixedly arranged on the hanger frame; and the hanging rope is wound around the guide wheel, and has another end connected to a patient, to adjust a vertical altitude of this end of the hanging rope through a horizontal movement of the slider.

7 Claims, 10 Drawing Sheets

(51) Int. Cl.
  *A61H 1/02* (2006.01)
  *B25J 9/00* (2006.01)
  *A63B 22/02* (2006.01)
(52) U.S. Cl.
  CPC ......... *A61H 1/0262* (2013.01); *A61H 1/0266* (2013.01); *A61H 3/00* (2013.01); *B25J 9/0006* (2013.01); *A61H 3/008* (2013.01); *A61H 2201/0142* (2013.01); *A61H 2201/0165* (2013.01); *A61H 2201/0176* (2013.01); *A61H 2201/0192* (2013.01); *A61H 2201/1215* (2013.01); *A61H 2201/1481* (2013.01); *A61H 2201/165* (2013.01); *A61H 2201/1621* (2013.01); *A61H 2201/1642* (2013.01); *A61H 2201/1652* (2013.01); *A61H 2201/1676* (2013.01); *A61H 2201/5071* (2013.01); *A61H 2203/0406* (2013.01); *A61H 2203/0456* (2013.01); *A63B 22/0235* (2013.01)
(58) Field of Classification Search
  CPC .... A61H 2201/1642; A61H 2201/1676; A61H 1/00; A61H 1/02; A61H 1/0237; A61H 1/024; A61H 1/0244; A61H 1/0262; A61H 1/0266; A61H 3/00; A61H 3/008; A61H 3/0244; A61H 9/0028; A61H 9/005; A61H 2201/0119; A61H 2201/0138; A61H 2201/0142; A61H 2201/1207; A61H 2201/1238; A61H 2201/1246; A61H 2201/1409; A61H 2201/16; A61H 2201/1619; A61H 2201/1621; A61H 2201/1623; A61H 2201/1626; A61H 2201/164; A61H 2205/08; A61H 2205/081; A61H 2205/10; A61H 2205/106; A61H 2205/108; A61H 2205/12; A61H 2201/42; A61H 2201/1652; A61H 2201/50; A61H 2201/5005; A61H 2201/5051; B25J 9/0006
  See application file for complete search history.

(56) References Cited

U.S. PATENT DOCUMENTS

| | | | | |
|---|---|---|---|---|
| 4,619,208 A * | 10/1986 | Kurrasch | ............... | A47B 9/12 108/106 |
| 5,372,561 A * | 12/1994 | Lynch | ............... | A63B 69/0064 482/54 |
| 5,662,560 A * | 9/1997 | Svendsen | ............... | A61H 3/04 482/54 |
| 6,685,658 B1 * | 2/2004 | Dietz | ............... | A61H 1/0229 128/845 |
| 7,381,163 B2 * | 6/2008 | Gordon | ............... | A63B 22/02 482/69 |
| 7,883,450 B2 | 2/2011 | Hidler | | |
| 2002/0026130 A1 * | 2/2002 | West | ............... | A61F 5/0102 601/23 |
| 2004/0019304 A1 * | 1/2004 | West | ............... | A61H 1/0237 601/5 |
| 2004/0116839 A1 * | 6/2004 | Sarkodie-Gyan | ...... | A61H 3/008 601/35 |
| 2005/0209060 A1 * | 9/2005 | Lull | ............... | A63B 22/0235 482/54 |
| 2007/0043308 A1 * | 2/2007 | Lee | ............... | A61H 1/0237 601/34 |
| 2008/0086816 A1 * | 4/2008 | Farooqui | ............... | A61B 6/0457 5/601 |
| 2008/0132383 A1 * | 6/2008 | Einav | ............... | A61H 1/02 482/8 |
| 2008/0255488 A1 * | 10/2008 | Agrawal | ............... | A63B 21/00181 602/23 |
| 2009/0320206 A1 * | 12/2009 | Dyreby | ............... | A47B 9/20 5/611 |
| 2010/0298102 A1 * | 11/2010 | Bosecker | ............... | A61H 1/005 482/54 |
| 2012/0004581 A1 * | 1/2012 | Dinon | ............... | A61H 1/0237 601/23 |
| 2012/0172770 A1 * | 7/2012 | Almesfer | ............... | B25J 9/0006 601/35 |
| 2013/0289452 A1 * | 10/2013 | Smith | ............... | B25J 9/0006 601/33 |
| 2014/0213951 A1 * | 7/2014 | Pietrusisnki | ............ | A61H 1/024 602/23 |
| 2014/0228720 A1 * | 8/2014 | Kim | ............... | A61H 3/008 601/35 |
| 2015/0127018 A1 * | 5/2015 | Lim | ............... | A61H 3/00 606/130 |
| 2015/0142130 A1 * | 5/2015 | Goldfarb | ............... | A61H 1/024 623/25 |
| 2015/0250675 A1 * | 9/2015 | Kalinowski | ............ | A61H 3/008 482/69 |
| 2015/0272809 A1 * | 10/2015 | Accoto | ............... | A61H 1/0237 623/31 |
| 2015/0297934 A1 * | 10/2015 | Agrawal | ............... | A61H 1/0266 482/4 |
| 2015/0320630 A1 * | 11/2015 | Bucher | ............... | A61H 1/0229 601/26 |
| 2015/0342817 A1 | 12/2015 | Gu et al. | | |
| 2016/0136477 A1 * | 5/2016 | Bucher | ............... | A63B 22/02 482/4 |
| 2018/0085276 A1 * | 3/2018 | Brodard | ............... | A61H 1/0262 |

FOREIGN PATENT DOCUMENTS

| | | |
|---|---|---|
| CN | 102225034 A | 10/2011 |
| CN | 102743270 A | 10/2012 |
| CN | 203017137 U | 6/2013 |
| CN | 203619845 U | 6/2014 |
| CN | 203647656 U | 6/2014 |
| CN | 103892987 A | 7/2014 |
| CN | 104800043 A | 7/2015 |
| JP | 2001029410 A | 2/2001 |
| WO | 2010120165 A1 | 10/2010 |

OTHER PUBLICATIONS

International Search Report for PCT/CN2015/081042, dated Jan. 27, 2016, ISA/CN.
The European Search Report for EP15890470.6, dated Mar. 23, 2018.

* cited by examiner

LOWER LIMB REHABILITATION TRAINING ROBOT

This application is the national phase of International Application No. PCT/CN2015/081042, titled "LOWER LIMB REHABILITATION TRAINING ROBOT" filed on Jun. 9, 2015, which claims the benefit of priority to Chinese patent application No. 201520263283.9 titled "LOWER LIMB REHABILITATION TRAINING ROBOT", filed with the Chinese State Intellectual Property Office on Apr. 27, 2015, the entire disclosures of which are incorporated herein by reference.

FIELD

The present application relates to the technical field of medical devices, and more particularly to a lower limb rehabilitation training robot.

BACKGROUND

Rehabilitation training is an important part of rehabilitation medicine, is an important means to enable the ill, injured or disabled person to be physically and mentally healthy and to realize functional rehabilitation, and is also one component of a comprehensive treatment for the ill, injured or disabled person.

In recent years, gait disturbances caused by factors such as traffic accidents, industrial accidents and stroke occur frequently, and the number of patients suffering from the stroke and the spinal cord injuries is continuously increased. These patients not only need to receive an operative treatment or a drug therapy, but also need to receive a scientific rehabilitation training to help restoring the motor function of limbs.

In the conventional rehabilitation training, generally a doctor and a therapist assist manually the patient with standing and walking trainings. However such passive training pattern has a large working strength, can hardly ensure the consistency of rehabilitation training actions, and cannot meet the requirements of patients in different rehabilitation stages. Therefore, standardized gait rehabilitation training receives more and more attention in the field of rehabilitation.

As a result of the development of electronic technology, electronic instruments are employed in the process of rehabilitation training more and more. Through the assistance of electronic instruments or robots, the patient can perform rehabilitation training safely. However, the conventional lower limb rehabilitation training robots generally can only allow the patient to perform training in a standing state, and for patients in different rehabilitation stages, especially the patients in an early training stage, standing too long and bearing the full weight of the body will cause discomfort to the patients, and thus such robots are not suitable for patients with a weak walking ability. Moreover, the conventional robots have a poor positioning accuracy, and can hardly achieve a better rehabilitation training.

Therefore, the technical issue to be addressed by the person skilled in the art is to make the lower limb rehabilitation training robot applicable for patients in different rehabilitation stages.

SUMMARY

In view of this, an object of the present application is to provide a lower limb rehabilitation training robot which can provide different patients with trainings of different angles and modes and are applicable for patients in different rehabilitation stages.

In order to achieve the above object, the following technical solutions are provided according to the present application.

A lower limb rehabilitation training robot includes a base bedstead, a rising bedstead and a bionic leg arranged on the rising bedstead; a vertical lifting module, a horizontal movement module and a steel cable are arranged on the base bedstead, and the steel cable is configured to connect the vertical lifting module to the horizontal movement module, to allow the vertical lifting module to be driven by a horizontal movement of the horizontal movement module to vertically rise and fall;

the vertical lifting module is hinged to one end of a bedstead main body of the rising bedstead by a hinge shaft, and an adjustment device configured to allow the bedstead main body to rotate about the hinge shaft is further provided between the vertical lifting module and the bedstead main body; and a slider movable horizontally and a hanging rope having one end connected to the slider are arranged on a hanger frame connected to the rising bedstead, a guide wheel configured to tension the hanging rope is fixedly arranged on the hanger frame; and the hanging rope is wound around the guide wheel, and has another end configured to be connected to a patient, to adjust a vertical altitude of the end, connected to the patient, of the hanging rope through a horizontal movement of the slider.

Preferably, the lower limb rehabilitation training robot further includes an extension bedstead horizontally arranged, the extension bedstead is connected to one side of the base bedstead, and an altitude of the extension bedstead is the same as an altitude of the vertical lifting module at a lowest position.

Preferably, the horizontal movement module is connected to a servo motor, and the servo motor is connected to a control system, to adjust the control to the horizontal movement module by the servo motor.

Preferably, the lower limb rehabilitation training robot further includes a pressure sensor arranged on a foot rest of the bionic leg, the pressure sensor is connected to the control system, and the foot rest is connected to the hanging rope.

Preferably, the hanger frame is connected to the bedstead main body through a second hinge shaft, the bedstead main body is hinged to one end of a hydraulic damper, and another end of the hydraulic damper is hinged to the electric hanger.

Preferably, the bionic leg includes:

a hip joint width adjustment mechanism connected to a bionic leg support block arranged on the bedstead main body;

a hip joint depth adjustment mechanism slidably cooperating with the hip joint width adjustment mechanism;

a hip joint connection block slidably cooperating with the hip joint depth adjustment mechanism;

a bionic leg electric push rod arranged on the hip joint depth adjustment mechanism;

a hip joint swinging mechanism arranged on the hip joint connection block;

a hip joint motor arranged on the hip joint connection block and configured to drive the hip joint swinging mechanism to swing;

a knee joint connection block connected to the hip joint swinging mechanism;

a knee joint swinging mechanism arranged on the knee joint connection block;

a knee joint motor arranged on the knee joint connection block and configured to drive the knee joint swinging mechanism to swing;

an ankle joint connection block connected to the knee joint swinging mechanism, the foot rest being arranged on the ankle joint connection block;

an ankle joint motor arranged on the ankle joint connection block and configured to drive the foot rest to swing;

a thigh fixing mechanism arranged on the knee joint connection block; and a shank fixing mechanism arranged on the ankle joint connection block.

Preferably, the hip joint motor and the hip joint swinging mechanism are in belt transmission connection;

and/or, the knee joint motor and the knee joint swinging mechanism are in belt transmission connection;

and/or, the ankle joint motor and the foot rest are in belt transmission connection.

Preferably, the lower limb rehabilitation training robot further includes:

a power failure protection device, wherein the power failure protection device includes a brake pad arranged in the motor and configured to stop an operation of the motor at the time of power off, and the brake pad is connected to the control system;

and/or, a real-time protection device, wherein the real-time protection device includes a servo driver arranged at an output end of the motor and configured to monitor a current change, and the servo driver is connected to the control system.

Preferably, the lower limb rehabilitation training robot further includes an electric treadmill connected to a bottom of the base bedstead. The electric treadmill includes a treadmill synchronous pulley and a treadmill motor configured to drive the treadmill synchronous pulley to rotate, and a roller is provided in the treadmill synchronous pulley.

Preferably, the control system includes a standard gait data module.

In the lower limb rehabilitation training robot according to the present application, the base bedstead and the rising bedstead form a main body structure of the lower limb rehabilitation training robot. The rotations of the rising bedstead at different angles are achieved by the angle adjustment device between the rising bedstead and the vertical lifting module. The horizontal movement module of the lower limb rehabilitation training robot moves horizontally, thereby driving the vertical lifting module to move vertically. The hanger frame controls the length of the hanging rope connected to the patient, to adjust the center of gravity of the patient, which can reduce the pressure on the foot and leg of the patient, and enable the weight support training of the patient to be continuously adjustable and achieve training at different angles in cases of different body postures of the patient.

In a preferred embodiment of the present application, an extension bedstead at the same altitude as the initial position of the vertical lifting mechanism is further arranged at one side of the base bedstead, and thus, the length of the bedstead can be extended to facilitate the use of the patient.

In a preferred embodiment of the present application, the horizontal movement module is connected via a servo motor, and the horizontal movement module is driven by the servo motor connected to the control system, to allow the movement of the vertical lifting module to be more accurate and the control to the vertical lifting module to be more convenient. The servo motor can be used to vertically adjust the center of gravity of the patient on the rising bedstead, to simulate the up and down swinging of the center of gravity of the body of the patient during the walking, to allow the center of gravity of the patient to be more stable.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only embodiments of the present application, and for the person skilled in the art, other drawings may be obtained based on the provided drawings without any creative efforts.

Figure 1:
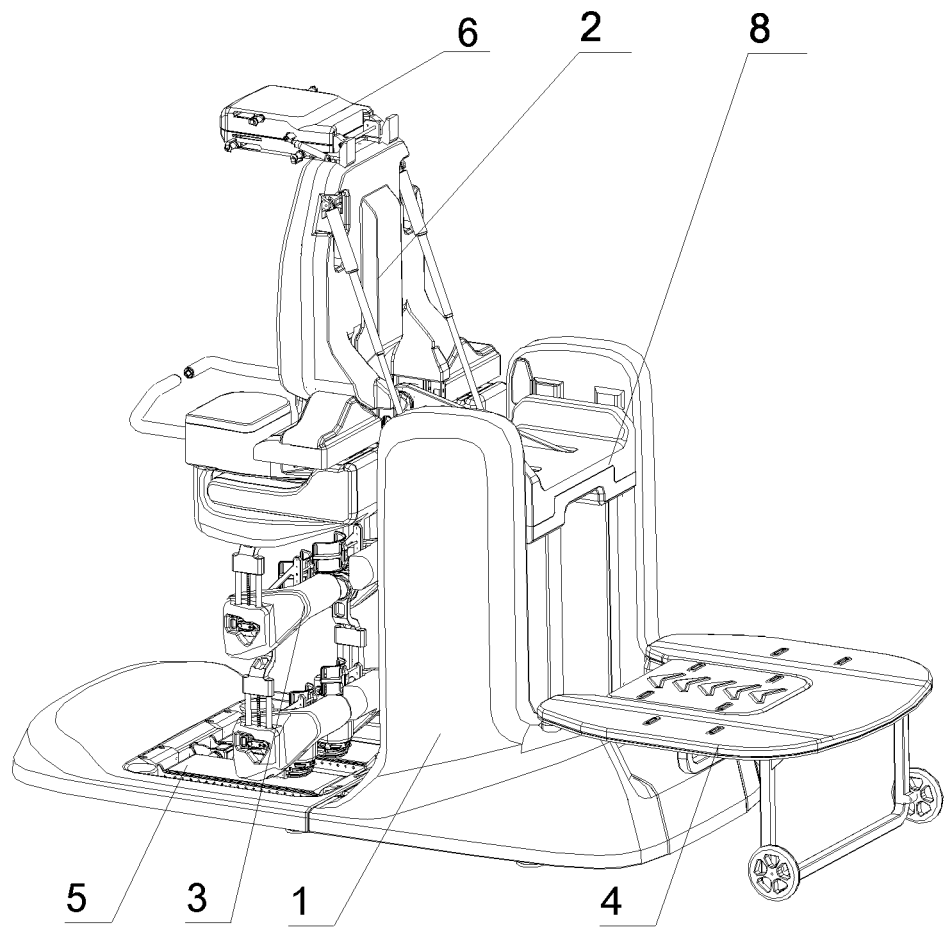
FIG. 1 is a schematic view of an embodiment of a lower limb rehabilitation training robot according to the present application.
Figure 2:
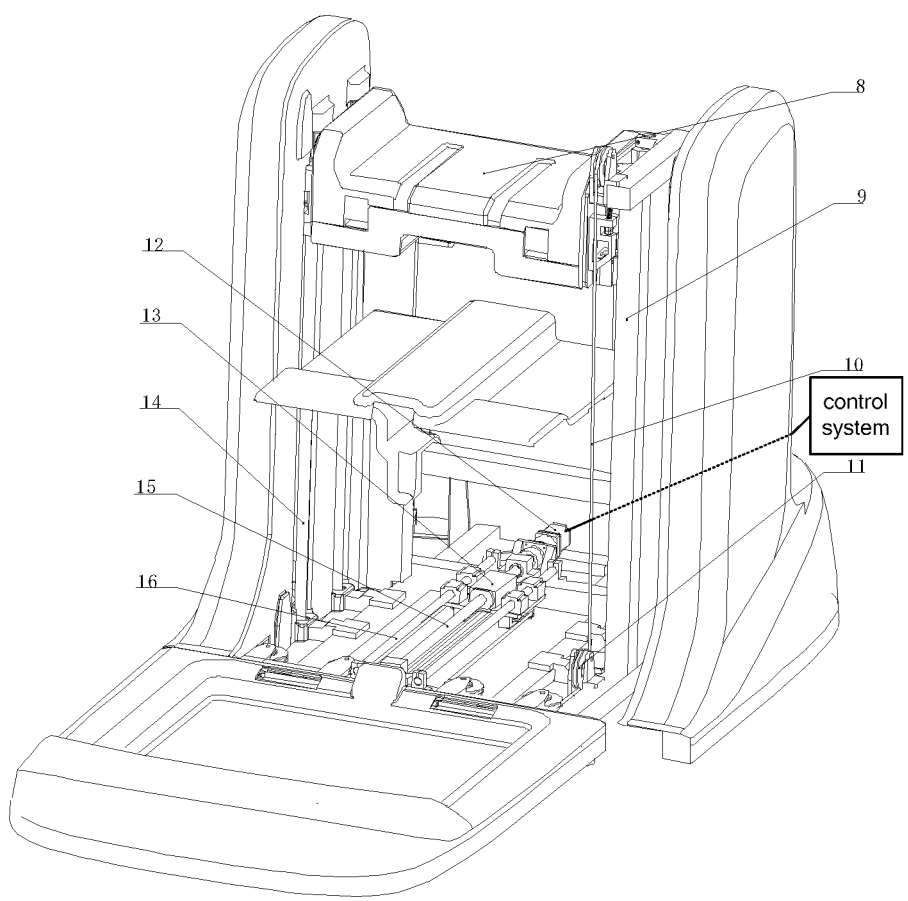
FIG. 2 is a schematic view of a base bedstead in an embodiment of the lower limb rehabilitation training robot according to the present application.
Figure 3:
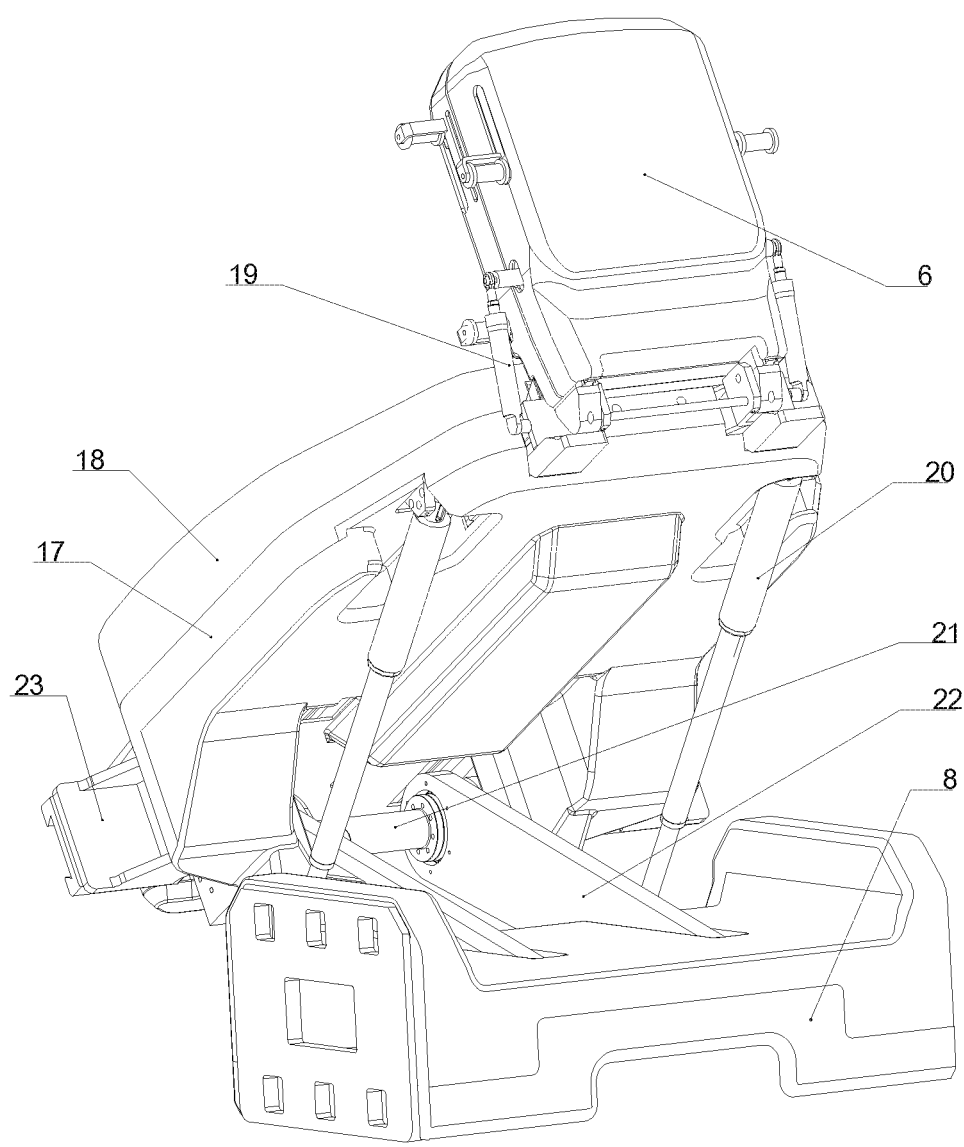
FIG. 3 is a schematic view of a rising bedstead in an embodiment of the lower limb rehabilitation training robot according to the present application.

| Reference Numerals: | |
|---|---|
| 1 base bedstead, | 2 rising bedstead, |
| 3 bionic leg, | 4 extension bedstead, |
| 5 electric treadmill, | 6 electric hanger, |
| 8 vertical lifting module, | 9 side support frame, |
| 10 steel cable, | 11 pulley block, |
| 12 servo motor, | 13 horizontal movement module, |
| 14 vertical polish rod, | 15 screw rod, |
| 16 horizontal polish rod, | 17 bedstead main body, |
| 18 mattress, | 19 hydraulic damper, |
| 20 electric push rod, | 21 rotating shaft, |
| 22 rotating shaft connection block, | 23 bionic leg support block; |
| 24 hip joint width adjustment mechanism, | 25 hip joint width locking mechanism, |
| 26 hip joint depth adjustment mechanism, | 27 bionic leg electric push rod, |
| 28 hip joint synchronous pulley, | 29 hip joint connection block, |
| 30 hip joint motor, | 31 hip joint swinging mechanism; |
| 32 knee joint synchronous pulley, | 33 knee joint motor, |
| 34 thigh fixing mechanism, | |
| 35 thigh length adjusting and locking mechanism, | |
| 36 knee joint connection block, | 37 knee joint swinging mechanism; |
| 38 ankle joint motor, | 39 shank fixing mechanism, |
| 40 ankle joint connection block, | |
| 41 shank length adjusting and locking mechanism, | |
| 42 ankle joint synchronous pulley, | 43 specialized shoe, |
| 44 foot rest; | |
| 45 treadmill motor, | 46 coupling, |
| 47 treadmill synchronous pulley, | 48 belt, |
| 49 connecting member, | 50 roller; |
| 51 hanger sliding mechanism, | 52 hanger push rod, |
| 53 fixed guide wheel, | 54 sliding guide wheel, |
| 55 hanger frame, and | 56 hanging rope. |

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of protection of the present application.

The core of the present application is to provide a lower limb rehabilitation training robot which allows a patient to perform training at different angles and circumstances and is applicable to patients in different rehabilitation stages.

Reference is made to FIG. 1 which is a schematic view of an embodiment of a lower limb rehabilitation training robot according to the present application. The lower limb rehabilitation training robot according to this embodiment mainly includes a base bedstead 1, a rising bedstead 2, a bionic leg 3, an electric hanger 6 and a control system.

The lower limb rehabilitation training robot according to this embodiment takes the base bedstead 1 as a loading main body, the rising bedstead 2 is directly mounted on the base bedstead 1, and the bionic leg 3 and the electric hanger 6 are mounted on the rising bedstead 2. The number of the bionic leg 3 can be one or two, which can be adjusted according to different trainings since the training modes are different.

Referring to FIGS. 2 to 5, FIGS. 2 to 5 are respectively schematic views showing the structure of the base bedstead, the rising bedstead and the electric hanger and a sectional view of the electric hanger in embodiments of the lower limb rehabilitation training robot according to the present application.

The base bedstead 1 is provided with a vertical lifting module 8, a horizontal movement module 13 and a steel cable 10 connecting the vertical lifting module 8 to the horizontal movement module 13 to allow the vertical lifting module 8 to be driven by a horizontal movement of the horizontal movement module 13 to rise and fall vertically.

The vertical lifting module 8 is hinged to one end of a bedstead main body 17 of the rising bedstead 2, and an adjustment device is provided between the vertical lifting module 8 and the bedstead main body 17 and is capable of adjusting an included angle between the vertical lifting module 8 and the bedstead main body 17.

A hanger frame 55 connected to the rising bedstead 2 is provided with a slider movable horizontally and a hanging rope 56 having one end connected to the slider. A guide wheel is fixed on the hanger frame 55. The hanging rope 56 is wound around the guide wheel and has another end configured to be connected to a patient, thereby adjusting the vertical altitude of the end, connected to the patient, of the hanging rope 56 by the horizontal movement of the slider.

The base bedstead 1 and the rising bedstead 2 form a main body structure of the lower limb rehabilitation training robot. The rotations of the rising bedstead 2 at different angles are achieved by the adjustment device for adjusting the angle between the rising bedstead 2 and the vertical lifting module 8 and arranged between the rising bedstead 2 and the vertical lifting module 8. The rising bedstead 2 is further provided with the bionic leg 3. The horizontal movement module of the above-mentioned lower limb rehabilitation training robot moves horizontally, thereby driving the vertical lifting module to move vertically. The hanger frame 55 controls the length of the hanging rope 56 connected to the patient, to adjust the center of gravity of the patient, which can reduce the pressure on the foot and leg of the patient, and enable the weight support training of the patient to be continuously adjustable and achieve training at different angles in cases of different body postures of the patient.

By using the horizontal movement module 13 to drive the vertical lifting module 8 to move vertically, the altitude of the rising bedstead 2 connected to the vertical lifting module 8 can be changed, thereby allowing the robot to be applicable for patients with different heights, and also realizing training modes of the patient in different cases.

In an embodiment of the present application, the base bedstead 1 may include a base frame and two side support frames 9 provided on the base frame. The base frame includes the horizontal movement module 13, a screw rod 15 and a horizontal polish rod 16. The horizontal movement module 13 is a module group including multiple fixedly connected modules. A main body of the horizontal movement module 13 is sleeved on the screw rod 15, and another part of modules fixedly connected to the main body of the horizontal movement module 13 are sleeved on the horizontal polish rod 16 which is in parallel with the screw rod 15. The horizontal movement module 13 is connected to a power unit and is driven by the power unit, and the horizontal movement module 13 is horizontally movable along the screw rod 15. The two side support frames 9 are each provided with a vertical polish rod 14, and the vertical lifting module 8 is arranged on the vertical polish rods 14. The horizontal movement module 13 is also connected with a steel cable 10, and the steel cable 10 is wound round a pulley group 11 arranged on the base frame and the side support frame 9 and has another end connected to the vertical lifting module 8, thus, the steel cable 10 can be driven to roll by the movement of the horizontal movement module 13, which in turn realizes the rotation of the pulley group 11, and finally changes the altitude of the vertical lifting module 8, and thus driving the vertical lifting module 8 to move up and down. Main components of the robot such as the rising bedstead 2, the bionic leg 3 are directly or indirectly mounted on the vertical lifting module 8, and the vertical lifting module 8 is configured to utilize its own vertical lifting function to change the altitude of the rising bedstead 2.

Optionally, the main structure of the base bedstead 1 is to utilize the electrically driven horizontal movement module 13 to drive the steel cable 10 wound around the pulley block to move, to adjust the altitude of the vertical lifting module 8. However, the specific structure is not limited to the above case. For example, the base frame and the side support frames 9 may be formed integrally, and compared with the integrally formed structure, the separated structure may facilitate the installation and adjustment of the robot.

Further, the horizontal movement module 13 is controlled by a servo motor 12. The servo motor 12 can accurately control position and speed, and after being connected to a control system, the servo motor 12 is controlled by a signal from the control system, and thus has an accurate outputting capability. Therefore, with the devices such as the servo motor 12, the steel cable 10 and the pulley group 11, the micro distance adjustment in rising and falling of the rising bedstead 2 can be realized, to simulate the state that the center of gravity of the body of the patient swings up and down normally during the training, which provides the function of adjusting the center of gravity for the patient on the rising bedstead 2, to allow the center of gravity of the patient be more stable and natural when the patient uses the robot. Such arrangement enables the lower limb rehabilitation training robot to have an improved simulation capability, to better meeting the normal training needs.

In an embodiment of the present application, two ends of a telescopic electric push rod 20 are respectively hinged to the vertical lifting module 8 and the bedstead main body 17, to allow the bedstead main body 17 to turn with respect to the vertical lifting module 8. The electric push rod 20 is connected to the control system and is directly controlled by the control system. The turning of the bedstead main body 17 is achieved by the control system and the electric push rod 20, thus, the angle of turning can be effectively controlled precisely.

Specifically, the bedstead main body 17 is provided with a mattress 18 and a bionic leg support block 23. The bionic leg support block 23 is configured to be connected to the bionic leg 3. The bottom surface of the bedstead main body 17 is further provided with a rotating shaft 21, and the rotating shaft 21 may be hinged directly to the vertical lifting module 8. Optionally, a rotating shaft connection block 22 is sleeved on the rotating shaft 21. Two rotating shaft connection blocks 22 are each rotatably connected to the rotating shaft 21, and another end of each of the two rotating shaft connection blocks 22 is fixedly connected to the vertical lifting module 8. The rotating shaft 21 may be raised vertically by the rotating shaft connection blocks 22, to form a gap between the bedstead main body 17 and the vertical lifting module 8, and to avoid interference with the rotation of the bedstead main body 17 about the rotating shaft 21.

The telescopic electric push rod 20 has one end hinged to a lateral side of the bedstead main body 17 and has another end hinged to the vertical lifting module 8, and the electric push rod 20 is connected to the control system. Optionally, the hinging positions, where the electric push rod 20 is hinged to the bedstead main body 17 and the control system, can be determined according to demands, and if the hinging positions are arranged at the edge positions of the bedstead main body 17 and the vertical lifting module 8, it can better facilitate increasing the pushing stroke of the electric push rod 20.

Figure 10:
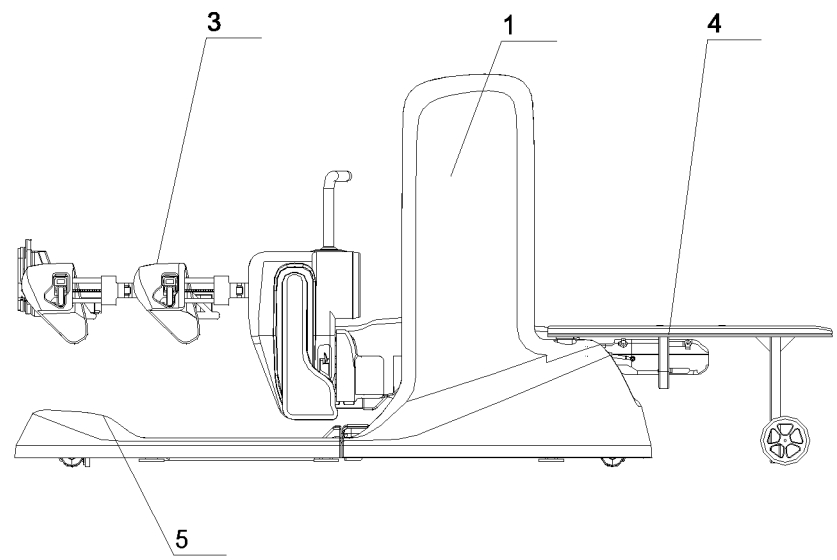
FIG. 10 is a schematic view of the lower limb rehabilitation training robot in a horizontal state according to the present application.
Figure 11:
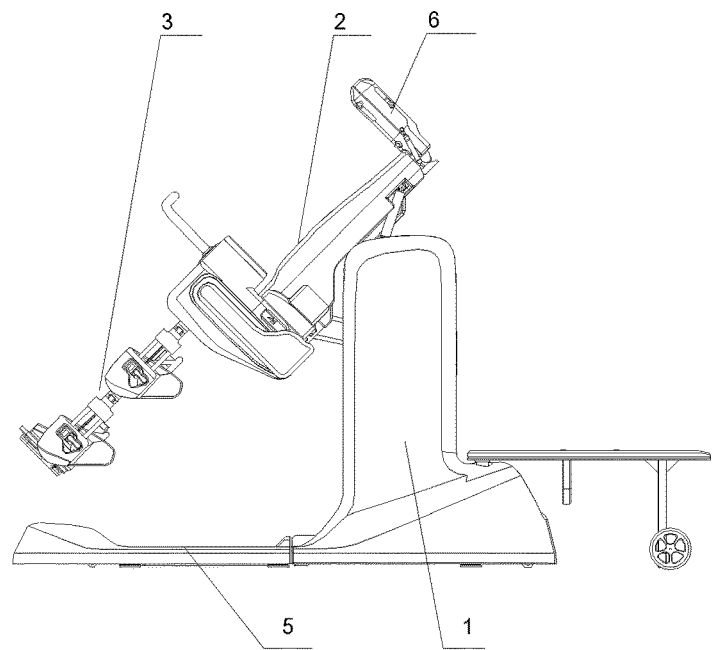
FIG. 11 is a schematic view of the lower limb rehabilitation training robot in an intermediate state according to the present application.
Figure 12:
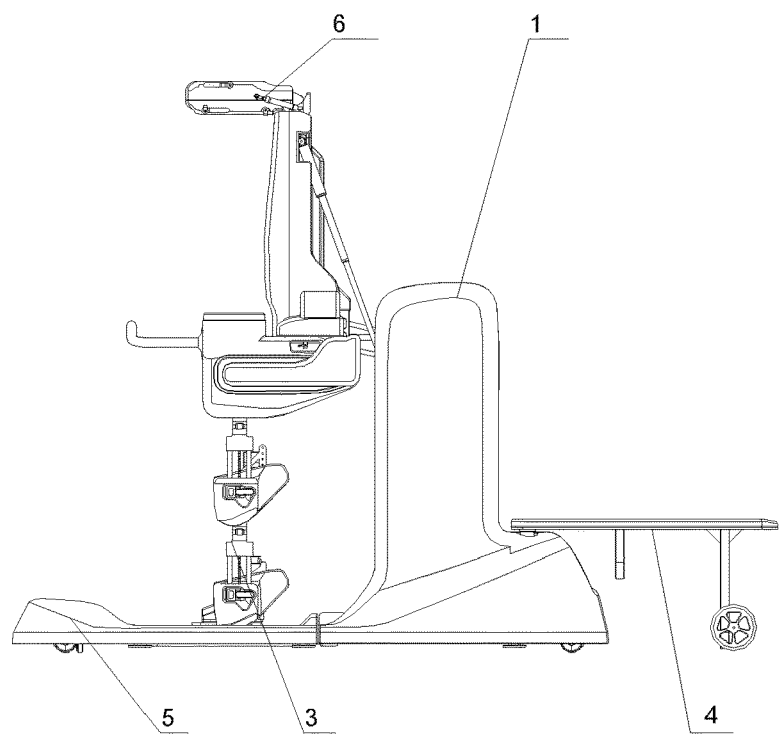
FIG. 12 is a schematic view of the lower limb rehabilitation training robot in a vertical state according to the present application.
Figure 13:
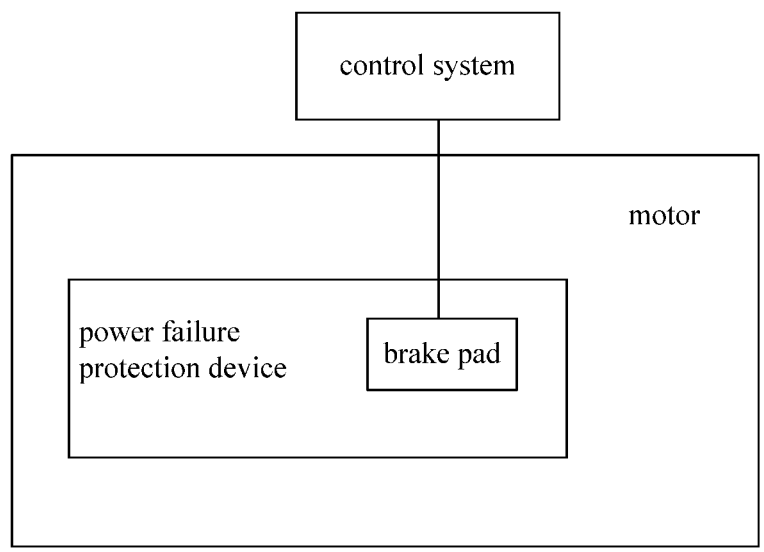
FIG. 13 is a schematic view showing a power failure protection device.
Figure 14:
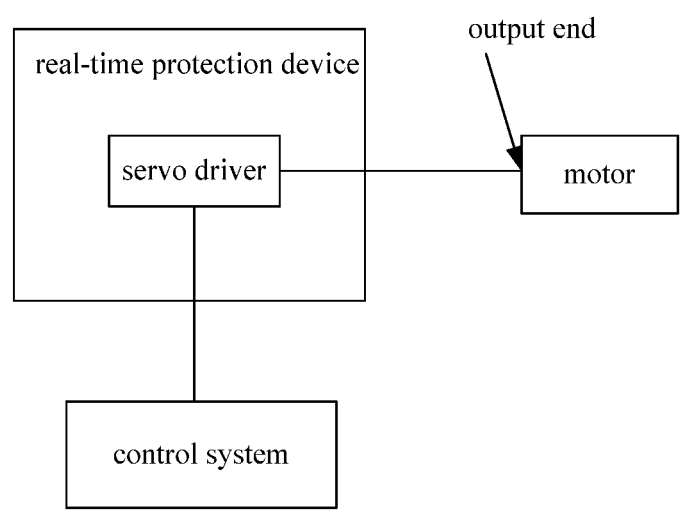
FIG. 14 is a schematic view showing a real-time protection device.

Reference is made to FIGS. 10 to 12, FIG. 10 is a schematic view of the lower limb rehabilitation training robot in a horizontal state according to the present application; FIG. 11 is a schematic view of the lower limb rehabilitation training robot in an intermediate state according to the present application; and FIG. 12 is a schematic view of the lower limb rehabilitation training robot in a vertical state according to the present application.

In an initial state, the bedstead main body 17 is in parallel with the vertical lifting module 8, and the electric push rod 20 is in a retracted state. When the control system sends an instruction to drive the electric push rod 20 extend, the electric push rod 20 pushes the bedstead main body 17 to rotate about the rotating shaft 21, to allow the bedstead main body 17 to drive the mattress 18 and the bionic leg support block 23 to rotate. Since the bedstead main body 17 and the vertical lifting module 8 are in parallel with each other in the initial position, the electric push rod 20 can push the bedstead main body 17 from the horizontal state to a vertical upright state, thus enabling the bedstead main body 17 to turn from 0 degree to 90 degrees.

Optionally, the two electric push rods 20 may be provided on two lateral sides of the bedstead main body 17 respectively, which can allow the bedstead main body 17 to turn more than 90 degrees without interfering with the movement of the bedstead main body 17.

Optionally, the structure of the rising bedstead 1 is not limited to the above-described case, for example, the arrangement of the mattress 18, the number of the rotating shaft connection blocks 22, the specific connecting position where the electric push rod 20 and the bedstead main body 17 are connected, can be adjusted according to specific circumstances.

Figure 4:
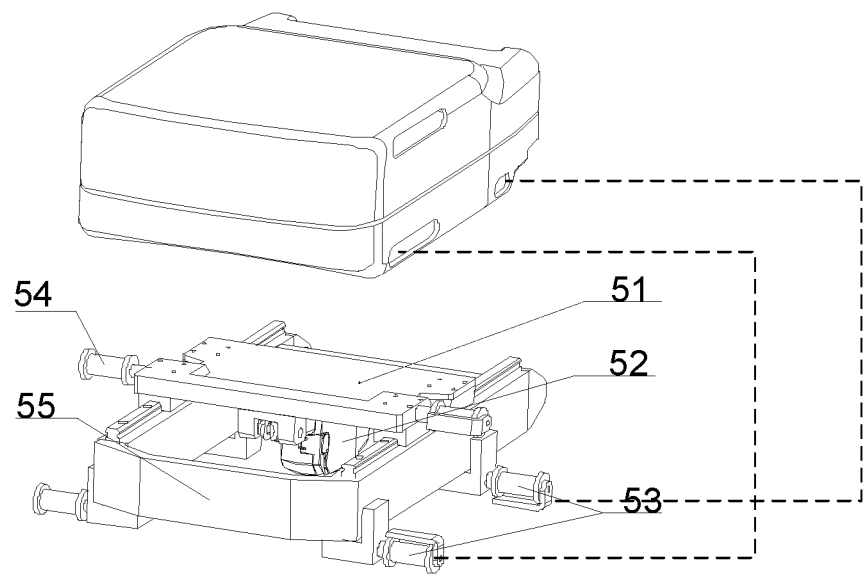
FIG. 4 is a schematic view showing the structure of an electric hanger in an embodiment of the lower limb rehabilitation training robot according to the present application.
Figure 5:
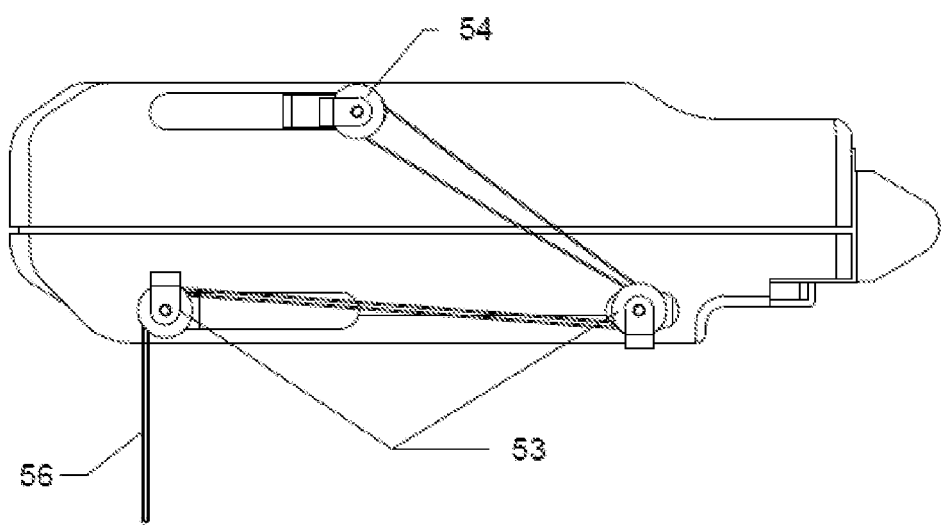
FIG. 5 is a sectional view of the electric hanger in an embodiment of the lower limb rehabilitation training robot according to the present application.

Referring to FIGS. 4 and 5, in an embodiment of the present application, the electric hanger 6 provided on the rising bedstead 2 includes a hanger frame 55 and an electrically driven slider arranged on a slide rail of the hanger frame 55.

Optionally, the slider is a movable hanger sliding mechanism 51, and one end of the hanging rope 56 is fixed to a sliding guide wheel 54 of the hanger sliding mechanism 51.

In an embodiment of the present application, the hanger sliding mechanism 51 is connected to an electrically driven hanger push rod 52. The hanger push rod 52 may push the hanger sliding mechanism 51 to move horizontally, thereby driving the sliding guide wheel 54, on which the hanging rope 56 is fixed, to move. The hanger frame 55 is further provided with a set of guide wheels. The hanging rope 56 may be fixed onto the sliding guide wheel 54 in a single line manner or a double line manner and then is wound around the set of guide wheels, and another end of the hanging rope 56 is configured to be connected to the patient or a corresponding bionic leg 3. The hanger sliding mechanism 51 performs horizontal movement, however, during the moving process, after being wound round the guide wheels, the hanging rope 56 falls downwards to be connected to the patient, therefore, the horizontal movement of the hanger sliding mechanism 51 can drive the end, connected to the patient or the corresponding bionic leg 3, of the hanging rope 56 to move up and down, to drive the patient or the bionic leg 3 to move in the vertical direction, thereby achieving the adjustment of the hanging altitude of the patient.

Optionally, the guide wheel may be a fixed guide wheel 53 or a movable guide wheel. If the guide wheel is the fixed guide wheel 53, the movement of the hanging rope 56 is achieved by the movement of the sliding guide wheel 54. If the guide wheel is the movable guide wheel, the length of the hanging rope 56 can be adjusted through the simultaneous movements, in the same directions or different directions, of the sliding guide wheel 54 and the movable guide wheels, and the number of the guide wheels is not limited to two.

Optionally, the structure of the electric hanger 6 is not limited to the above-described case, and the hanging rope 56 may also be connected to an electrically driven rotating shaft and wound around the electrically driven rotating shaft, to allow the hanging rope 56 to extend and retract.

In an embodiment of the present application, the control system may be connected to the servo motor 12, the electric push rod 20, the bionic leg 3 and the electric hanger 6 respectively, and the use process of the various components can be set by setting a control program or by direct control.

Figure 6:
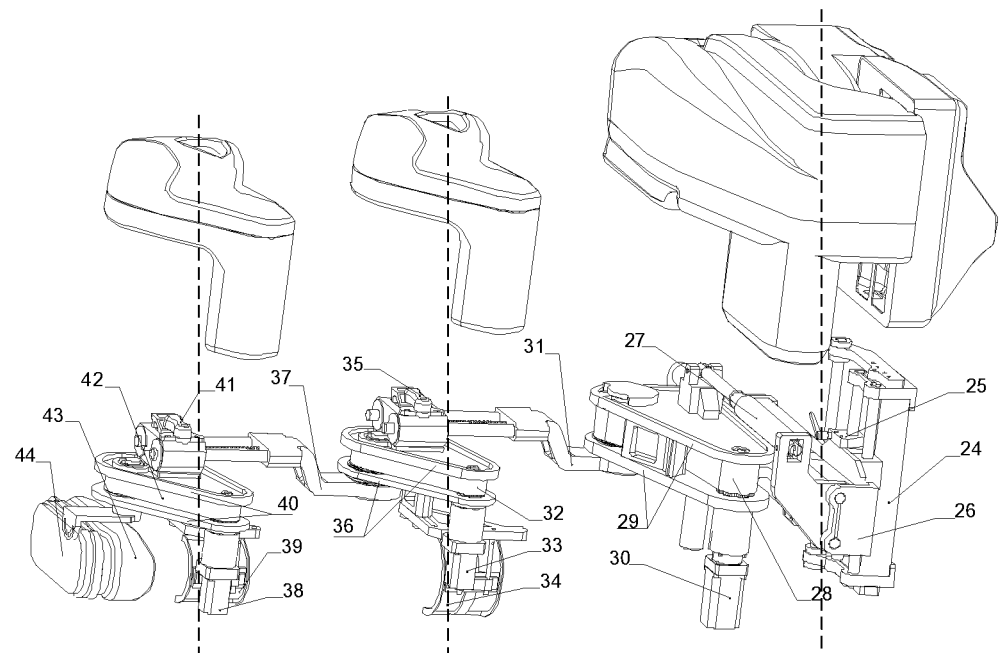
FIG. 6 is an exploded view of a bionic leg in an embodiment of the lower limb rehabilitation training robot according to the present application.
Figure 7:
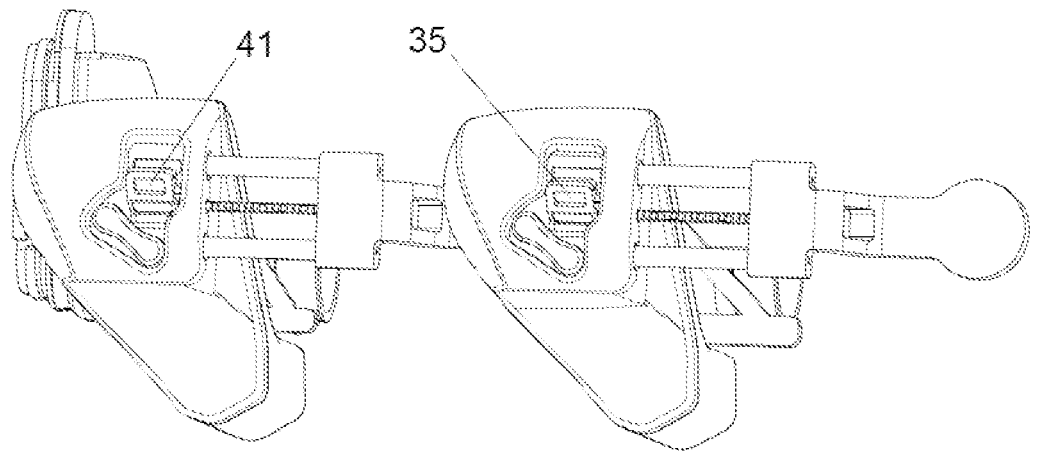
FIG. 7 is a schematic view showing the structure of the bionic leg at one side in an embodiment of the lower limb rehabilitation training robot according to the present application.
Figure 8:
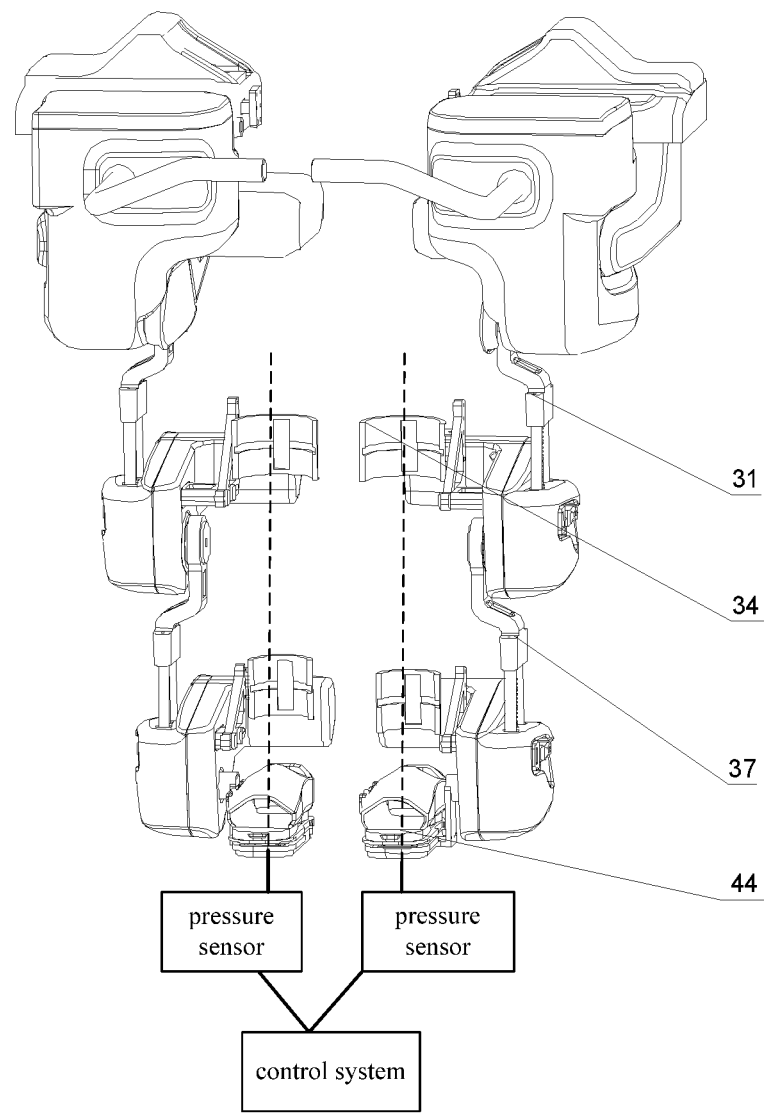
FIG. 8 is a schematic view showing the structure of the bionic legs in an embodiment of the lower limb rehabilitation training robot according to the present application.

Referring to FIGS. 6 to 8, FIG. 6 is an exploded view of a bionic leg in an embodiment of the lower limb rehabilitation training robot according to the present application; FIG. 7 is a schematic view showing the structure of the bionic leg at one side in an embodiment of the lower limb rehabilitation training robot according to the present application; and FIG. 8 is a schematic view showing the structure of the bionic leg in an embodiment of the lower limb rehabilitation training robot according to the present application.

A main effect of the bionic leg 3 of the lower limb rehabilitation training robot is to connect to the patient's leg and control the leg to perform normal leg movement. The bionic leg 3 is relatively fixed to the hip joint, knee joint and ankle joint of the patient's leg.

In an embodiment of the present application, the bionic leg 3 includes a hip joint control device, a knee joint control device, and an ankle joint control device.

The hip joint control device includes a hip joint width adjustment mechanism 24, a hip joint depth adjustment mechanism 26, a hip joint connection block 29, a bionic leg electric push rod 27, a hip joint swinging mechanism 31 and a hip joint motor 30.

The hip joint width adjustment mechanism 24 is connected to the bionic leg support block 23 arranged on the bedstead main body 17, and the hip joint width adjustment mechanism 24 can adjust the hip joint width and the adjusted hip joint width is locked by a hip joint width locking mechanism 25. The hip joint width adjustment mechanism 25 slidably cooperates with the hip joint depth adjustment mechanism 26. A width adjustment lever is arranged on the hip joint width adjustment mechanism 24, and a width adjustment sliding sleeve configured to cooperate with the hip joint width adjustment mechanism is arranged on the hip joint depth adjustment mechanism 26. The width is adjusted through the relative movement between the width adjustment lever and the width adjustment sliding sleeve.

The hip joint depth adjustment mechanism 26 is connected to the hip joint connection block 29. A depth adjustment lever is arranged on the hip joint depth adjustment mechanism 26, and a depth adjustment sliding sleeve configured to slidably cooperate with the depth adjustment lever is arranged on the hip joint connection block 29. The depth is adjusted through the relative movement between the depth adjustment lever and the depth adjustment sliding sleeve.

The hip joint depth adjustment mechanism 26 is provided with a bionic leg electric push rod 27. The bionic leg electric push rod 27 is connected to the hip joint connection block 29. The above two connections are both embodied as hinge connection, to prevent a dead point from occurring when the hip joint connection block 29 rotates. The bionic leg electric push rod 27 is extended and retracted under the action of the motor, and the above connections are configured to drive the hip joint connection block 29 to move.

The hip joint swinging mechanism 31 is hingedly connected to the hip joint connection block 29 and is rotatable with respect to the hip joint connection block 29. A hip joint synchronous pulley 28 and a hip joint motor 30 configured to drive the hip joint synchronous pulley 28 to rotate synchronously are provided in the hip joint connection block 29. The hip joint synchronous motor 30 drives the hip joint synchronous pulley 28 to rotate, and the hip joint synchronous pulley 28 drives the hip joint swinging mechanism 31 to rotate within a certain range, thereby achieving the swinging of the thigh portion of the patient.

Optionally, the hip joint motor 30 may also be embodied as other devices for providing power.

The knee joint control device is similar to the hip joint control device. A thigh length adjusting and locking mechanism 35 is slidably connected to the hip joint swinging mechanism 31, and the function of locking the thigh length adjustment can be achieved by fixing the relative position between the thigh length adjusting and locking mechanism 35 and the hip joint swinging mechanism 31.

A knee joint connection block 36 is fixedly connected to the thigh length adjusting and locking mechanism 35. A knee joint synchronous pulley 32 and a knee joint motor 33 configured to drive the knee joint synchronous pulley 32 are arranged on the knee joint connection block 36. A knee joint swinging mechanism 37 is connected to the knee joint synchronous pulley 32, to achieve the swinging of the shank of the patient. A thigh fixing mechanism 34 is arranged on the knee joint connection block 36 and functions to secure the thigh of the patient.

The ankle joint control device is similar to the knee joint control device. A shank length adjusting and locking mechanism 41 is fixed to an ankle joint connection block 40 and is slidably connected to the knee joint swinging mechanism 37, and the function of locking the shank length adjustment can be achieved by fixing the relative position between the shank length adjusting and locking mechanism 41 and the knee joint swinging mechanism 37.

A shank fixing mechanism 39 configured to be bond to the shank of the patient is arranged on the ankle joint connection block 40. An ankle joint motor 38 and an ankle joint synchronous pulley 42 driven by the ankle joint motor 38 are further arranged on the ankle joint connection block 40. The ankle joint synchronous pulley 42 is connected to a specialized shoe 43 by a hinge, thereby, the ankle joint motor 38 drives the ankle joint synchronous pulley 42 to adjust an angle of the specialized shoe 43, thus achieving the swinging of the ankle portion of the patient. A foot rest 44 is provided at the bottom of the specialized shoe 43.

The specific structure of each of the above adjustment mechanisms and the above locking mechanisms may be adjusted according to the specific implementations. Each of the above adjustment mechanisms may be locked by a mechanical structure or an electric device. In addition, each of the hip joint motor, the knee joint motor and the ankle joint motor can be embodied as an normal motor configured to drive a gear or a belt, or can be embodied as a servo motor configured to push a push rod.

On the basis of any of the above embodiments, the lower limb rehabilitation training robot may further be provided with an extension bedstead 4 horizontally arranged. The extension bedstead 4 is arranged at one side of the base bedstead 1. The extension bedstead 4 is at the same altitude with the vertical lifting module 8 at the lowest position, that is, the position of the extension bedstead 4 is the same as an initial position of the vertical lifting module 8. When the patient is ready to use the lower limb rehabilitation training robot, the horizontal altitude of the rising bedstead 2 is lowered to a lowest position which is level with the extension bedstead 4, thus allowing the patient to get on the robot through the extension bedstead 4 to make it convenient for the patient to use the robot.

Further, the extension bedstead 4 is not limited to be maintained at the same altitude as the vertical lifting module 8 at the lowest position, but can be an adjustable extension bedstead which can adjust its altitude and length by its own extension and retraction. Specifically, the adjustable extension bedstead 4 includes an extension bedstead body, a holder and rolling wheels. The extension bedstead body is a transversely extendable and retractable mechanism or the holder is a longitudinally extendable and retractable mechanism, which can both be implemented by means of a telescopic rod or the like. The extension bedstead body or the holder further includes a fixing device configured to fix the position of the telescopic rod. This device enables the robot to be applicable for more patients, which improves the convenience of the service.

On the basis of any of the above embodiments, the lower limb rehabilitation training robot further includes a pressure sensor arranged on the foot rest 44 of the bionic leg 3. The pressure sensor is connected to the control system, and the foot rest 44 is connected to the hanging rope 56. When the patient is standing on the foot rest 44, the pressure sensor senses the pressure exerted by the patient on the foot rest, and transmits the sensed pressure to the control system. The control system analyzes the pressure and the body weight of the patient to determine whether the sole pressure of the patient exceeds the range of the bearable pressure for the patient, and controls the electric hanger 6 to lift the center of gravity of the patient, to reduce the sole pressure of the patient and prevent the patient from bearing an excessive pressure when the patient has a weak lower limb movement capacity.

Optionally, the hanger frame 55 of the electric hanger 6 is rotatably connected to the bedstead main body 17. Specifically, the electric hanger 6 is connected to the bedstead main body 17 through a second hinge shaft. The bedstead main body 17 is hinged to one end of a hydraulic damper 19, and another end of the hydraulic damper 19 is hinged to the electric hanger 6. When the patient is ready to use the lower limb rehabilitation training robot, the horizontal altitude of the rising bedstead 2 is lowered to the lowest position, and is level with the extension bedstead 4. When the patient gets on the robot from the extension bedstead 4, the electric hanger 6 is in parallel with the bedstead main body 17, to facilitate the movement of the patient. When the patient is fixed to the bionic leg 3, the electric hanger 6 can be manually smoothly turned between 0 degree to 90 degrees through the hydraulic damper. The design of the electric hanger 6 not only meets the use convenience for the patient, but also meets the changeability of the position of the electric hanger 6.

Optionally, transmission connections between the hip joint motor 30 and the hip joint swinging mechanism 31, between the knee joint motor 33 and the knee joint swinging mechanism 37, and between the ankle joint motor 38 and the foot rest 44 can each employ a belt transmission connection. The advantage of using the belt transmission connection is that the belt itself has tension, and under the action of the tension, a certain buffering effect is presented between the motors and the corresponding swinging mechanisms, and the buffering effect can improve the balancing capability and the action effect of the swinging mechanisms.

On the basis of any of the above embodiments, a power failure protection device may be further provided. The power failure protection device includes a brake pad arranged in a motor and configured to stop the operation of the motor when power is off, and the brake pad is connected to the control system. Each of the hip joint motor 30, the knee joint motor 33, the ankle joint motor 38, and the servo motor 12 is simply referred to as a motor. Since the brake pad is provided in the motor, when an accidental power failure occurs, the brake pad can stop the operation of the motor, to avoid injuring the patient because the motor cannot stop operating in time due to inertia in case of accident. This arrangement can also be applied to the case of sudden power failure of the motor when a sudden situation occurs.

On the basis of any of the above embodiments, a real-time protection device may be further provided, and the real-time protection device includes a servo driver arranged at an output end of the motor and configured to monitor the current change. The servo driver is connected to the control system.

Figure 9:
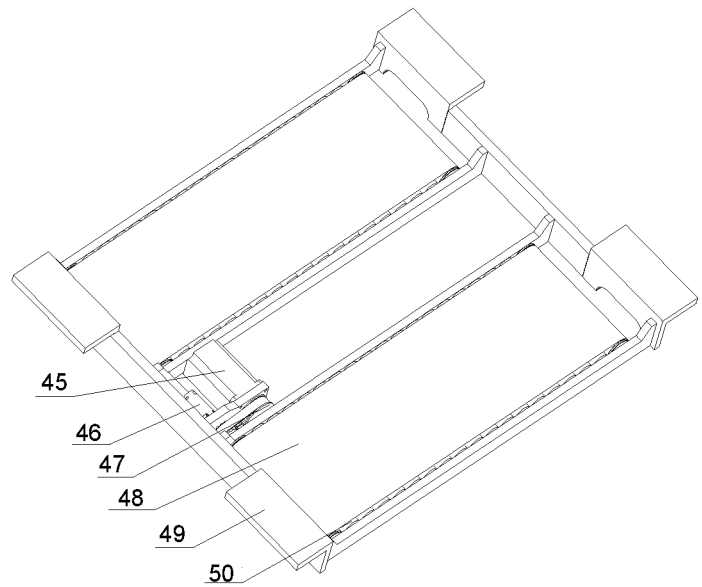
FIG. 9 is a schematic view showing the structure of an electric treadmill in an embodiment of the lower limb rehabilitation training robot according to the present application.

An electric treadmill 5 may be further provided on the basis of any of the above embodiments. Reference is made to FIG. 9 which is a schematic view showing the structure of the electric treadmill in an embodiment of a lower limb rehabilitation training robot according to the present application. The electric treadmill 5 is arranged on the floor at one side of the base bedstead 1. The electric treadmill 5 includes a coupling 46, a treadmill synchronous pulley 47, and a treadmill motor 45 configured to drive the treadmill synchronous pulley 47 to rotate. Rollers 50 are arranged in a belt 48. The treadmill motor 45 drives the treadmill synchronous pulley 47 to rotate the rollers 50, to achieve the rotation of a belt 48 arranged outside the rollers 50. The electric treadmill 5 is connected to the base bedstead 1 through a connecting member 49 arranged on the electric treadmill 5.

Optionally, on the basis of any of the above embodiments, a standard gait data module is further provided in the control system, and is configured to store relevant data such as standard gait data. The action of the bionic leg 3 is controlled and adjusted through the data, to assist the patient in practicing the standard normal step.

In addition to the main structures and components of the lower limb rehabilitation training robot disclosed in the above embodiments, the structures of other parts of the lower limb rehabilitation training robot may refer to the conventional technology, and are not described further herein.

The above embodiments are described in a progressive manner. Each of the embodiments is mainly focused on describing its differences from other embodiments, and references may be made among these embodiments with respect to the same or similar portions among these embodiments.

The lower limb rehabilitation training robot according to the present application is described in detail hereinbefore. The principle and the embodiments of the present application are illustrated herein by specific examples. The description of the above embodiments is only intended to facilitate the understanding of the method and the concept of the present application. It should be noted that, for the person skilled in the art, several improvements and modifications may be made to the present application without departing from the principle of the present application, and these improvements and modifications are also deemed to fall into the scope of protection of the present application defined by the claims.

What is claimed is:

1. A lower limb rehabilitation training robot, comprising a base bedstead, a rising bedstead and a bionic leg arranged on the rising bedstead, wherein a vertical lifting module, a horizontal movement module and a steel cable are arranged on the base bedstead, and the steel cable is configured to connect the vertical lifting module to the horizontal movement module, to allow the vertical lifting module to be driven by a horizontal movement of the horizontal movement module to vertically rise and fall;

the vertical lifting module is hinged to one end of a bedstead main body of the rising bedstead by a hinge shaft, and two ends of a telescopic electric push rod are respectively hinged to the vertical lifting module and the bedstead main body, to allow the bedstead main body to turn with respect to the vertical lifting module;

a hanger sliding mechanism and a hanging rope are arranged on a hanger frame connected to the rising bedstead, a guide wheel configured to tension the hanging rope is fixedly arranged on the hanger frame; and the hanging rope is wound around the guide wheel and has one end fixed to a sliding guide wheel of the hanger sliding mechanism and has another end configured to be connected to a patient to adjust a vertical altitude of such another end of the hanging rope through a horizontal movement of the hanger sliding mechanism; and wherein the horizontal movement module is a module group comprising multiple fixedly connected modules, a main body of the horizontal movement module is sleeved on a screw rod, and another part of the multiple fixedly connected modules fixedly connected to the main body of the horizontal movement module are sleeved on a horizontal polish rod which is in parallel with the screw rod; and the horizontal movement module is connected to a power unit and is driven to move horizontally along the screw rod by the power unit.

2. The lower limb rehabilitation training robot according to claim 1, further comprising an extension bedstead horizontally arranged, wherein the extension bedstead is connected to one side of the base bedstead, and an altitude of the extension bedstead is the same as an altitude of the vertical lifting module at a lowest position.

3. The lower limb rehabilitation training robot according to claim 2, wherein the horizontal movement module is connected to a servo motor, and the servo motor is connected to a control system, to adjust the control to the horizontal movement module by the servo motor.

4. The lower limb rehabilitation training robot according to claim 3, further comprising a pressure sensor arranged on a foot rest of the bionic leg, wherein the pressure sensor is connected to the control system, and the foot rest is connected to the hanging rope.

5. The lower limb rehabilitation training robot according to claim 4, wherein an electric hanger is connected to the bedstead main body through a second hinge shaft, the bedstead main body is hinged to one end of a hydraulic damper, and another end of the hydraulic damper is hinged to the electric hanger.

6. The lower limb rehabilitation training robot according to claim 1, further comprising an electric treadmill connected to a bottom of the base bedstead, wherein the electric treadmill comprises a treadmill synchronous pulley and a treadmill motor configured to drive the treadmill synchronous pulley to rotate, and a roller is provided in a belt.

7. The lower limb rehabilitation training robot according to claim 6, wherein the control system comprises a gait data module.

* * * * *